US006650089B1

(12) United States Patent
Freeman et al.

(10) Patent No.: US 6,650,089 B1
(45) Date of Patent: Nov. 18, 2003

(54) CONTROL CIRCUIT FOR MULTIPLE BATTERY SYSTEMS WITH CAPACITY GAUGE ON END EQUIPMENT

(75) Inventors: David Freeman, McKinney, TX (US); Jose Antonio Vieira Formenti, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/272,110

(22) Filed: Oct. 16, 2002

(51) Int. Cl.[7] ................................................. H02J 7/00
(52) U.S. Cl. ....................................... 320/132; 320/130
(58) Field of Search ............................ 320/132, 106, 320/130, 118, 125, 127, 137, 160; 324/426, 434; 307/150, 87, 86, 66

(56) References Cited

U.S. PATENT DOCUMENTS 5,148,042 A * 9/1992 Nakazoe ..................... 307/86
5,315,228 A   5/1994 Hess et al. .................. 320/132
6,201,372 B1 * 3/2001 Green, Jr. et al. ........... 320/132
6,403,252 B1   6/2002 Chiang et al. ................ 429/96
6,459,237 B1 * 10/2002 Bausch ....................... 320/125

* cited by examiner

*Primary Examiner*—Lawrence Luk
(74) *Attorney, Agent, or Firm*—W. Daniel Swayze, Jr.; W. James Brady; Frederick J. Telecky, Jr.

(57) ABSTRACT

A capacity gauge is provided that measures a selected battery capacity of a plurality of batteries in a multiple battery system. A capacity gauge and a battery current sense resistor reside on the end equipment, while the battery pack contains minimal information associated with the battery pack. Control circuits provide for proper pack selection and pack connection timing, as well as capacity gauge synchronization. Power up/down circuits provide power to control logic, the selection circuits and capacity gauge at power up, power down and battery pack removal. The system is powered by a selected battery pack after the battery pack selection is executed, and the selected battery pack monitored by the capacity gauge.

20 Claims, 7 Drawing Sheets

CONTROL CIRCUIT FOR MULTIPLE BATTERY SYSTEMS WITH CAPACITY GAUGE ON END EQUIPMENT

TECHNICAL FIELD

The present invention relates to electrical circuits and more particularly to a control circuit for multiple battery systems with a capacity gauge on end equipment.

BACKGROUND OF INVENTION

Portable electronic devices (e.g., notebook computers, cellular telephone, cordless telephones mobile data terminals, radio frequency portable communication devices, etc.) typically include a rechargeable battery that is charged by a recharging unit plugged into an AC power source, such as that found in conventional 115 VAC lines. Certain rechargeable batteries can be recharged by coupling the rechargeable battery to a DC voltage source (e.g., car adapter, plane adapter, airplane adapter, USB power bus). The recharging unit powers the portable device, while simultaneously charging the rechargeable battery. The portable device switches over to battery power upon removal of the portable device from the charging unit or the power source. Some portable electronic devices are provided with two or more batteries, so that the portable electronic device can be used for longer periods of time than is possible with a single battery.

In systems with multiple batteries, a switching network is required to allow selective charging and discharging of each battery pack, while maintaining isolation between battery packs, a battery charger and a load. The switching network is controlled by a control system or controller on the system end (e.g., portable electronic device), which also controls selective charging and discharging of each of the battery packs. Since rechargeable batteries have a limited lifespan, it is desirable to maximize the life of each battery during discharge cycles. This is accomplished by fully and efficiently charging and discharging the battery without causing temperature abuse and overcharging. Many known battery chargers do not have the capability to accurately determine the charge level and the total charge capacity of a battery and can overcharge the battery reducing its useful life. Most portable devices include removable or replaceable batteries. Therefore, maintaining charge history information at the system end is impractical since a batteries history can change when it is removed and used in another system or simply experiences normal discharge during periods of non-use. end is impractical since a batteries history can change when it is removed and used in another system or simply experiences normal discharge during periods of non-use.

One solution to this problem has been to provide a capacity or fuel gauge with every battery pack. The capacity or fuel gauge may employ a coulomb counter that maintains a coulomb charge count that is incremented or decremented during charging and discharging, respectively. The capacity gauge can also be employed to determine he battery voltage, temperature, discharge current out of the battery, charge current into the battery, and charge and discharge history of the battery. In the many high-end multiple battery systems, an architecture is used where a capacity gauge is built in the battery pack, and the selection circuit is built in the end equipment or system side. This architecture requires the use of one capacity gauge per pack, increasing battery pack cost. Additionally, this increases the size of the battery pack and the overall power consumed since the dedicated capacity gauge circuitry is powered by each battery even when a battery is not selected for providing power to the system.

SUMMARY OF INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention relates to a capacity gauge and control that measures a selected battery capacity of a plurality of batteries in a multiple battery system. The capacity gauge and a battery current sense resistor reside on the end equipment, while the battery pack contains minimal information associated with the battery pack. Control circuits and/or algorithms provide for proper pack selection and pack connection timing, as well as capacity gauge synchronization. The control circuits and/or algorithms can be integrated into the capacity gauge and/or be a separate device from the capacity gauge. Power up/down circuits provide power to the capacity gauge and/or control, and the battery pack selection devices at power up, power down and battery pack removal. The system is powered by a selected battery pack after the battery pack selection is executed, and the selected battery pack monitored by the capacity gauge.

In one aspect of the invention, a power sequencer component provides power to the capacity gauge and/or control during power up, power down and battery pack removal. The power sequencer component includes a voltage regulator (e.g., Low Dropout (LDO) regulator) that receives power from one of a highest pack voltage and a DC supply voltage during power up, power down and battery pack removal. The power sequencer can include diodes coupling the battery pack supplies that are configured in a diode "OR" configuration to provide the highest voltage as the capacity gauge supply and/or control supply voltage. The voltage regulator provides a supply voltage to the capacity gauge and/or control, while a power sequencing algorithm is performed. The battery pack voltages are sampled and a desired battery pack is selected based on one or more parameters. The selected battery pack is then employed to power the capacity gauge and/or control during normal operation.

The following description and the annexed drawings set forth certain illustrative aspects of the invention. These aspects are indicative, however, of but a few of the various ways in which the principles of the invention may be employed. Other advantages and novel features of the invention will become apparent from the following detailed description of the invention when considered in conjunction with the drawings.

DETAILED DESCRIPTION OF THE INVENTION

The present invention relates to a single capacity gauge that measures battery capacity of a plurality of batteries in a multiple battery system. The present invention allows use of a single capacity gauge integrated circuit and a single battery current sense resistor on the end equipment, while still ensuring proper capacity gauge performance. The end equipment can be, for example, a portable unit such as a portable computer, a personal digital assistant (PDA), a portable phone or a variety of other different battery operated devices. Control circuits provide for proper pack selection and pack connection timing, as well as capacity gauge synchronization. Power up/down circuits provide power to the control logic, the selection circuits and capacity gauge at power up, power down and battery pack removal. The system is powered by a selected battery pack after the battery pack selection is executed.

Figure 1:
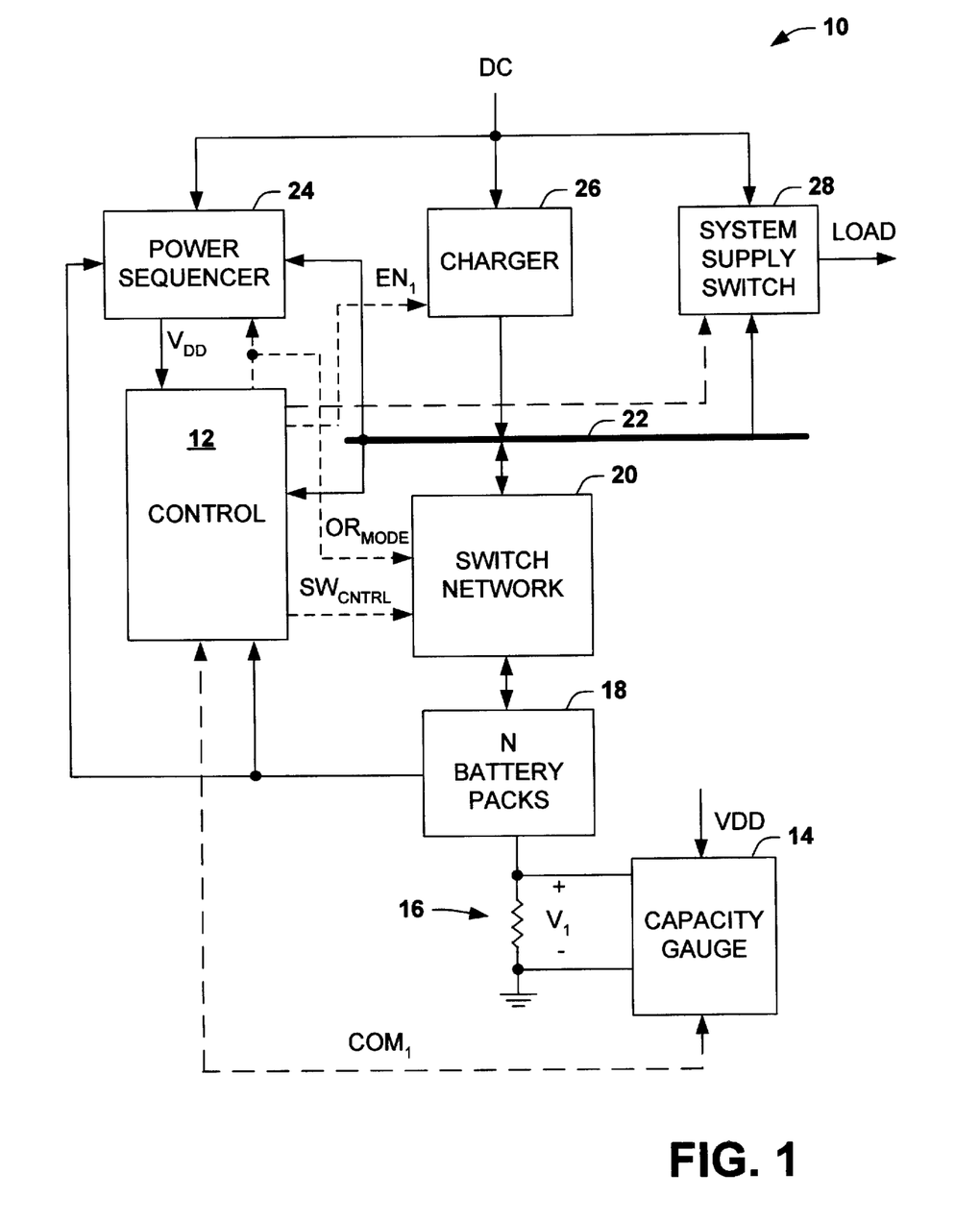
FIG. 1 illustrates a block diagram of a multiple battery system employing a single capacity gauge in accordance with an aspect of the present invention.

FIG. 1 illustrates a multiple battery system 10 employing a single capacity gauge 14 in accordance with an aspect of the present invention. The multiple battery system 10 includes a plurality (N, N being an integer greater than one) of battery packs 18 coupleable to a power bus 22 via a switch network 20. A control system 12 controls the selection of which battery pack of the plurality of battery packs 18 will be coupled to the battery bus 22. The control system 12 can decide on pack switching based on pack voltage, capacity and/or battery priority. The capacity gauge 14 and a precession resistor 16 are connected to ground terminals of each of the plurality of battery packs 18. The charge or discharge current of the selected battery flows through the precision resistor 16 to provide a voltage $V_1$, which is measured by the capacity gauge 14. The capacity gauge 14 employs the measured voltage to determine a coulomb charge count. The coulomb charge count can be employed to determine the useful life of the battery based on at least one of voltage, temperature, discharge current out of the battery over time, and charge current into the battery over time. The control system 12 and the capacity gauge 14 are synchronized over a communication link ($COM_1$). The control system 12 is in constant communication with the capacity gauge 14 to ensure that the appropriate battery is selected and that its capacity is updated and parameters are monitored.

A system supply switch 28 isolates the battery bus 22 and a DC source from a load. The load can be, for example, devices of a portable unit. A charger 26 is also coupled to the battery bus 22. The charger 26 includes an enable control ($EN_1$) provided by the control system 12 that disables and enables the charger 26. The DC supply is also coupled to the charger 26 to provide power to the charger 26. For example, an AC/DC adapter can receive AC power from an AC power source, such as that found in conventional 115 VAC lines and provide unregulated DC power to the DC supply. The DC supply converts the unregulated DC power to regulated DC power. The DC supply can be a synchronous buck converter or some other switching power supply.

The control system 12 controls the switching of the battery packs to the load, the charging of the batteries if DC is present and the isolation of the devices from one another. If DC power is available, the control system 12 provides DC power through the system supply switch 28 and isolates the battery bus 22 from the load, so that power from the DC supply is provided to the load. The charge from the charger 26 can then be made available at the battery power bus 22. If DC power is not available, the control system 12 provides selected battery power through the system supply switch 28 and isolates the DC supply from the load, so that power from the selected battery is provided to the load.

A power sequence on a multiple battery system (e.g., upon battery insertion/removal, power up, power down) is always critical. If the control system 12 is powered from the load supply, a situation can occur where the load voltage is zero, the control logic is not operational and the battery switches are not closed causing the load voltage to be zero and prohibiting startup. Additionally, there are conditions where the control system 12 is being powered from a specific battery. If the battery is removed, the control system 12 and the capacity gauge 14 will have their supply power interrupted.

The DC supply, the battery bus 22 and the positive terminals of each of the plurality of battery packs are provided to a power sequencer 24. The power sequencer 24 provides proper power up and power down sequencing of the system 10. The power sequencer 24 includes a dedicated voltage regulator that receives power from one of the DC supply or the positive terminal of the highest voltage battery pack during a power up sequence, and provides voltage $V_{DD}$ to power the system 10. This ensures proper initialization of the switch network 20, the capacity gauge 14 and the control system 12. Upon power up, the system 10 sets all switches in the switch network 20 to the "OFF" mode, enabling the control system 12 and/or capacity gauge 14 to execute a power-up configuration procedure. During this phase, the voltage regulator is provided power by a diode "OR" line that powers the voltage regulator from the higher pack voltage or the DC supply.

After power up sequencing, the control system 12 samples the pack voltages and capacities and decides pack selection based on internal algorithms to determine the desired selected battery. The selected pack is then connected to the battery bus 22 via the switch network 20 using switch control ($SW_{CNTRL}$) signals. The control system 12 measures the selected battery voltage from the battery bus 22. The control system 12 then informs the power sequencer 24 when a valid selected battery voltage is available. The power sequencer 24 then provides voltage $V_{DD}$ to the control system 12 and the capacity gauge 14 from the selected battery. Therefore, the capacity gauge 14 measures the capacity of the selected battery based on both power provided by the selected battery to the system load and the system 10.

When the selected battery is removed, a voltage drop on the selected battery line is detected by the control system 12. The control system 12 then sets the diode "OR" mode on the switch network 20 and the power sequencer 24 such that the power sequencer 24 provides voltage $V_{DD}$ to the control system 12 and the capacity gauge 14 through the highest voltage pack of the plurality of battery packs 18 providing power continuity for the capacity gauge 14 and the control system 12. The control system 12 samples all battery voltages/capacities and decides a new desired pack to be selected. After pack selection, the "OR" mode is reset, and the selected battery pack is employed to power the control system 12, the capacity gauge 14 and the load.

Figure 2:
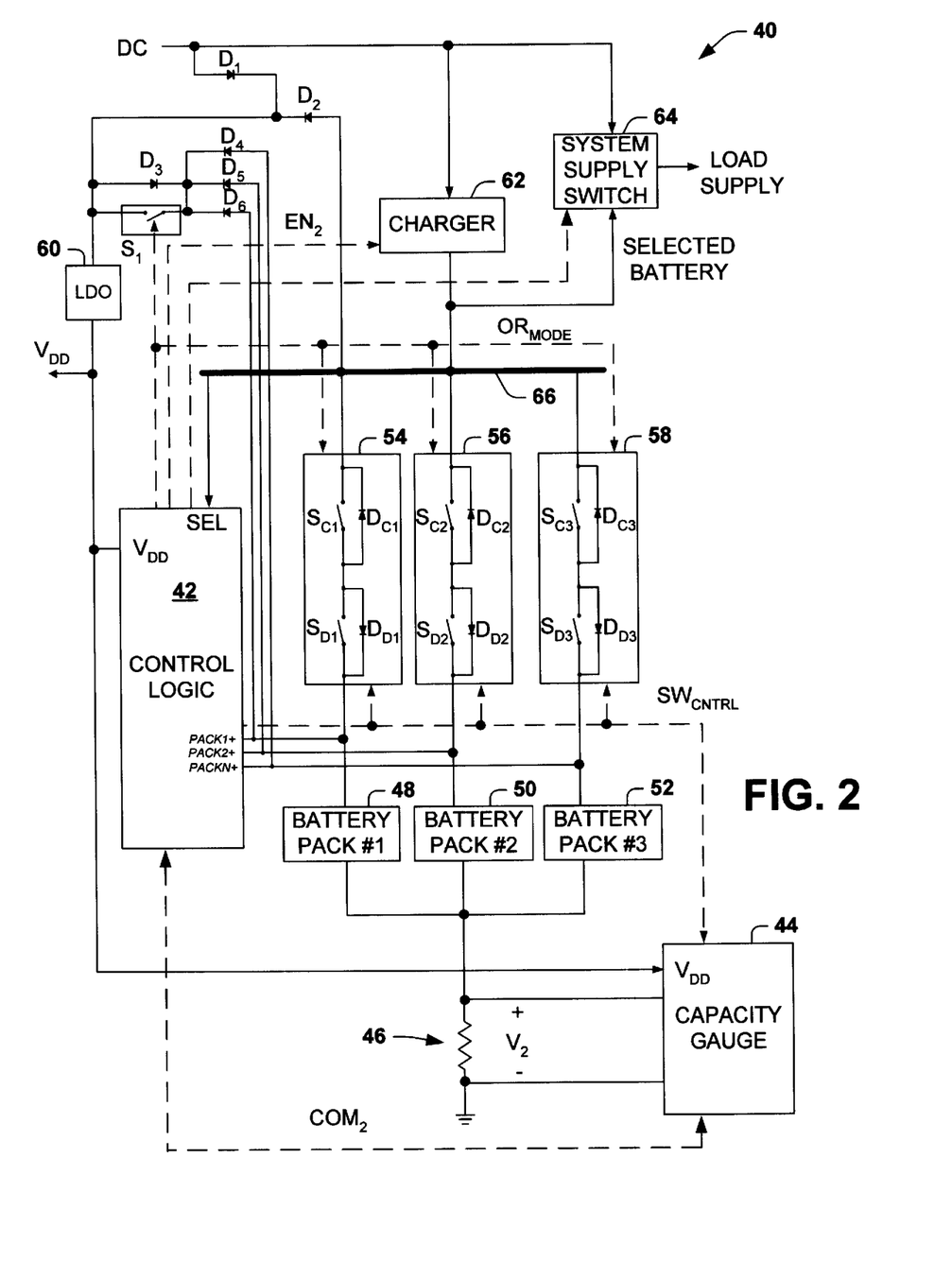
FIG. 2 illustrates a block diagram of a multiple battery system employing three battery packs and a single capacity gauge in accordance with an aspect of the present invention.

FIG. 2 illustrates a battery system 40 employing three batteries and a single capacity gauge 44 in accordance with an aspect of the present invention. The battery system 40 includes a first battery pack 48, a second battery pack 50 and a third battery pack 52. The first battery pack 48, the second battery pack 50 and the third battery pack 52 are coupleable to a battery power bus 66 via a first switch pair 54, a second switch pair 56 and a third switch pair 58, respectively. The first switch pair 54 includes a charge switch $S_{C1}$ and a diode $D_{C1}$, and a discharge switch $S_{D1}$ and a diode $D_{D1}$. The second switch pair 56 includes a charge switch $S_{C2}$ and a diode $D_{C2}$, and a discharge switch $S_{D2}$ and a diode $D_{D2}$, while the third switch pair 58 includes a charge switch $S_{C3}$ and a diode $D_{C3}$, and a discharge switch $S_{D3}$ and a diode $D_{D3}$. A control logic device 42 controls the selection of which battery pack will be coupled to the battery bus 66 via selection of the appropriate switches. The control logic device 42 can decide on pack switching based on pack voltage, capacity, temperature and/or battery priority.

A precision resistor 46 has a first terminal connected to the negative terminals of the first battery pack 48, the second battery pack 50 and the third battery pack 52, and a second terminal connected to ground. The capacity gauge 44 is connected to the first and second terminals of the precession resistor 46. The charge or discharge current of the selected battery flows through the precision resistor 46 to provide a voltage $V_2$, which is measured by the capacity gauge 44. The capacity gauge 44 employs the measured voltage to determine a coulomb charge count. The coulomb charge count can be employed to determine the useful life of the selected battery based on at least one of voltage, temperature, discharge current out of the battery over time, and charge current into the battery over time. The control logic device 42 and the capacity gauge 44 are synchronized over a communication link ($COM_2$). The control logic device 42 is in constant communication with the capacity gauge 44 to ensure that the appropriate battery is selected and that its capacity is updated and parameters are monitored.

A system supply switch 64 isolates the battery bus 66 and a DC source from a load. A charger 62 is also coupled to the battery bus 66. The charger 62 includes an enable control ($EN_2$) provided by the control logic device 42 that disables and enables the charger 62. The DC supply is also coupled to the charger 62 to provide power to the charger 62. The control logic device 42 controls the switching of the battery packs to the load, the charging of the batteries and the isolation of the batteries from one another. If DC power is available, the control logic device 42 provides DC power through the system supply switch 64 and isolates the battery bus 66 from the load, so that power from the DC supply is provided to the load. The charge current from the charger 62 can then be made available at the battery power bus 66. If DC power is not available, the control logic device 42 provides selected battery power through the system supply switch 64 and isolates the DC supply from the load, so that power from the selected battery is provided to the load.

The positive terminals of the first battery pack 48, the second battery pack 50 and the third battery pack are coupled in a diode "OR" configuration. The first battery pack 48 is coupled to an anode of a diode D6, the second battery pack 50 is coupled to an anode of a diode D5 and the third battery pack 52 is coupled to an anode of a diode D4. The cathodes of the diodes D4, D5 and D6 are coupled to a switch, which includes switch S1 and diode D3. The other end of the switch S1 is coupled to a low dropout (LDO) voltage regulator 60. The LDO voltage regulator 60 is also coupled to the DC supply through a diode D1 and the battery bus 66 through a diode D2. The switch S1 is controlled by the control logic device 42. Upon power up, the system 40 sets all the switches of the switch pairs 54, 56 and 58 to the "OFF" mode enabling the control system 42 and/or the capacity gauge 44 to execute a power-up configuration procedure. During this phase, the LDO voltage regulator 60 is provided power by a diode "OR" line that powers the LDO voltage regulator 60 from the higher pack voltage of the first battery pack 48, the second battery pack 50 or the third battery pack 52, or the DC supply. The control logic device 42 holds the switch S1 closed while the power up sequence is being executed by the control logic device 42 and/or the capacity gauge 44. After power up sequencing, the control logic device 42 samples the pack voltages via PACK1+, PACK2+ and PACK3+ sense and communication lines. The control logic device 42 then determines pack selection based on internal algorithms, for example, that determine the desired battery pack based on one or more pack parameters or criteria (e.g., pack voltage, pack capacity, pack priority, pack temperature). The selected pack is then connected to the battery bus 66 via switch control ($SW_{CNTRL}$) signals. The switch control ($SW_{CNTRL}$) signals close the associated charge switch $S_{CX}$ and close the associated discharge switch $S_{DX}$.

The control logic device 42 then measures the selected battery voltage from the battery bus 66. After the control logic device 42 determines that the measured selected battery voltage is within a valid range, the control logic device 42 opens switch S1, so that power is provided to the LDO voltage regulator 60 by the selected battery pack. The control logic device 42 and capacity gauge 44 are then powered by the selected battery. When the selected battery is removed, a voltage drop on the selected battery line is detected by the control logic device 42. The control logic device 42 then sets the diode "OR" mode on the battery switches by turning "ON" all discharge switches $S_{D1}$, $S_{D2}$ and $S_{D3}$ and turning "OFF" all charge switches $S_{C1}$, $S_{C2}$ and $S_{C3}$. The switch S1 is turned "ON" or closed to guarantee power continuity for the capacity gauge 44 and the control logic device 42. The control logic device 42 then samples all available battery voltages/capacities and decides a new desired pack to be selected. After pack selection, the "OR" mode is reset, the selected pack has the charge or discharge switches turned "ON" and the switch S1 is turned "OFF".

Figure 3:
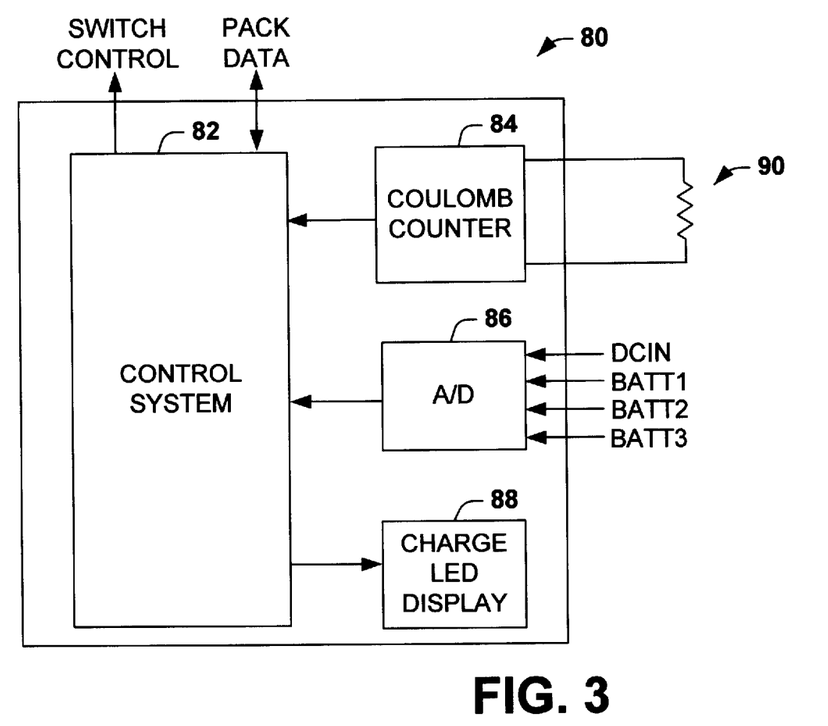
FIG. 3 illustrates a block diagram of an integrated capacity gauge and control device in accordance with an aspect of the present invention.

It is to be appreciated that the capacity gauge and control logic can be integrated into a single device, such as an integrated circuit device. FIG. 3 illustrates an integrated capacity gauge and control device 80 in accordance with an aspect of the present invention. The integrated capacity gauge and control device 80 includes a control system 82, a coulomb counter 84, an analog-to-digital (A/D) converter 86 and a charge LED display 88. The coulomb counter 84 is coupled to a precision resistor 90 for measuring charge and discharge associated with a selected battery pack. The control system 82 is in constant communication with the coulomb counter 84 to assure that accurate measuring and appropriate battery selection is occurring.

The A/D converter 86 receives voltage signals from the DC supply (DCIN), a first battery supply (BATT1), a second battery supply (BATT2), and a third battery supply (BATT3). The A/D converter 86 samples the voltage signal supply lines to determine the voltage levels of the different supplies and provides digital signal information to the control system 82. The control system 82 employs the sampled digital signal information in making decisions during power up, power down and battery selection for both charging and discharging of the batteries. The charge LED display 88 provides indication of whether a battery pack is in a charge mode or in a system supply mode.

The control system 82 employs switch control signals to select a battery for charging or discharging. Pack data can be retrieved from a battery pack and or transmitted from a battery pack. The pack data can include information relating to the charging and discharging of an individual battery pack. The pack data can be stored with the battery pack and include information such as cell type, manufacturer, last time charged or discharged, measured capacity, pack temperature, number of discharge and charge cycles and the estimated remaining life of the battery. The data can be retrieved from the individual battery packs, modified and the modified information stored in the individual battery packs.

Figure 4:
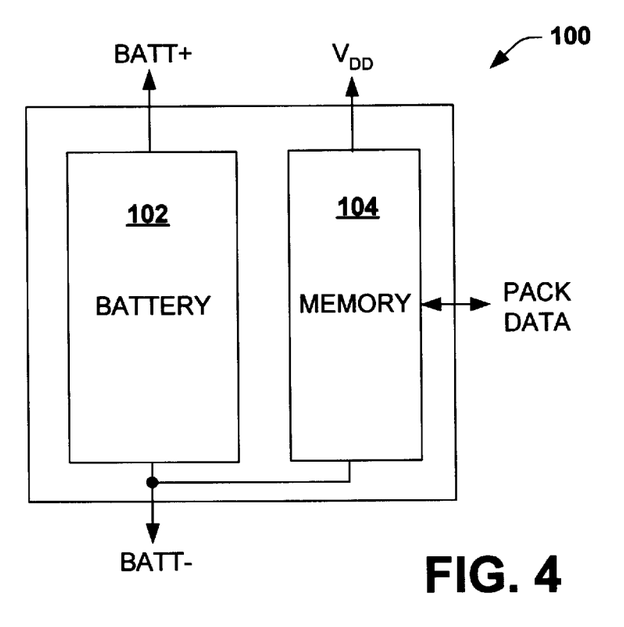
FIG. 4 illustrates a block diagram of a battery pack in accordance with an aspect of the present invention.

FIG. 4 illustrates an example of a battery pack 100 in accordance with an aspect of the present invention. The battery pack 100 includes a battery 102 having a positive terminal BATT+ and a negative terminal BATT−. The battery pack 100 also includes a non-volatile memory 104, such as an EPROM, a flash memory or the like. The non-volatile memory 104 can be powered by a voltage $V_{DD}$ provided by the battery system, such that the current drawn from the memory 104 can be included in the capacity gauge count. Alternatively, the memory 104 can be powered by the battery 102 directly. The memory 104 includes basic information about the battery pack that can be employed by a single capacity gauge system during charging and discharging of the battery pack.

Each battery pack can include similar arrangements such that minimal information is stored with each battery pack that can be employed by the capacity gauge during monitoring of charging and discharging of the battery pack. The memory associated with each battery pack retains the history of the battery pack with the functionality associated with the capacity gauge residing at the system end. Therefore, a single capacity gauge at the system end can be employed to measure charge and discharge of a battery over time with minimal circuitry (e.g., single memory device) provided at the battery pack 100.

Figure 5:
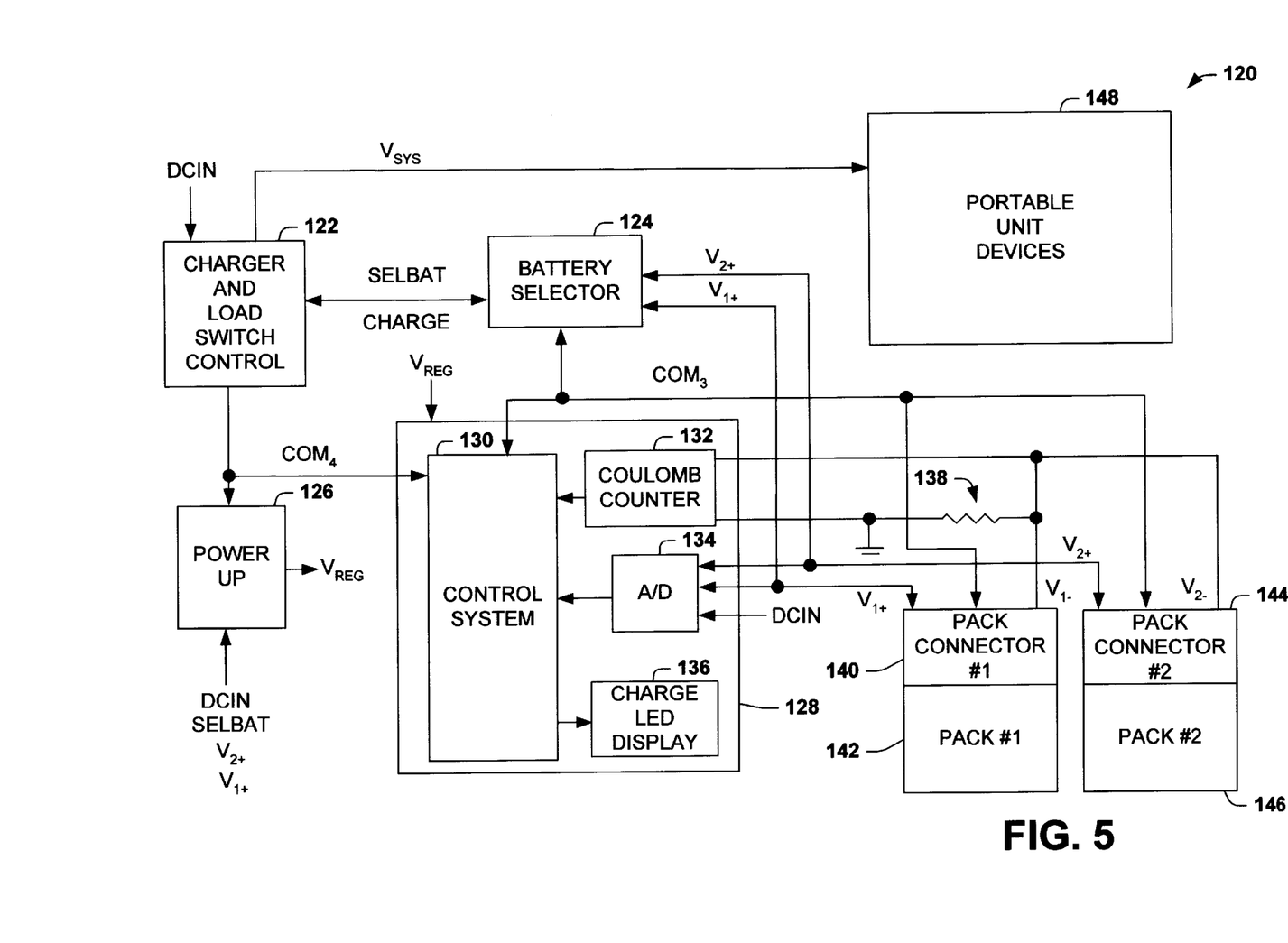
FIG. 5 illustrates a block diagram of an electronic portable unit in accordance with an aspect of the present invention.

FIG. 5 illustrates a portable unit 120 having a multiple battery system with a single capacity gauge 128 in accordance with an aspect of the present invention. The single capacity gauge 128 includes a control system 130, a coulomb counter 132, an analog-to-digital (A/D) converter 134 and a charge LED display 136. The coulomb counter 132 is coupled to a precision resistor 138 for measuring charge and discharge associated with a selected battery pack from amongst a first battery back (PACK#1) 142 and a second battery back (PACK#2) 146. The precision resistor 138 is coupled at one end to negative terminals $V_{1-}$ and $V_{2-}$ of the first battery back 142 and the second battery back, respectively, and at a second end to ground. The control system 130 is in constant communication with the coulomb counter 132 to assure that accurate measuring and appropriate battery selection is occurring. The A/D converter 134 receives voltage signals from a DC supply (DCIN), the first battery back (PACK#1) voltage $V_{1+}$ and the second battery back (PACK#2) voltage $V_{2+}$. The A/D converter 134 samples the voltage signal supply lines to determine the voltage levels of the different supplies and provides digital signal information to the control system 130. The control system 130 employs the sampled digital signal information in making decisions during power up, power down and battery selection for both charging and discharging of the battery packs. The charge LED display 136 provides indication on system status such as whether a battery pack is in a charge mode or in a system supply mode.

The control system 130 employs switch control signals through a communication bus ($COM_3$) to select a battery for charging or discharging via a battery selector component 124. Pack data can be retrieved from the first battery pack 142 and the second battery pack 146, or transmitted to be stored at the first battery pack 142 and second battery pack 146 via the communication bus ($COM_3$). The first battery pack 142 is coupleable to the communication bus ($COM_3$) through a first pack connector 140 (Pack Connector#1) and the second battery pack 146 is coupleable to the communication bus ($COM_3$) through a second pack connector 144 (Pack Connector#2). The pack data can include information relating to the charging and discharging of an individual battery pack. The pack data can be stored with the battery pack and include information such as cell type, manufacturer, last time charged or discharged, measured capacity, number of discharge and charge cycles and the estimated remaining life of the battery. The data can be retrieved from the individual battery packs, modified and the modified information stored in the individual battery packs.

A charger and load switch control component 122 receives a DC signal (DCIN) from an AC adapter, and a selected battery voltage (SELBAT) from the battery selector component 124. The charger and load switch control component 122 provides a control signal through a communication bus ($COM_4$) to the control system 130 and a power up component 126 to inform the control system 130 and the power up component 126 whether or not an AC adapter is present. The charger and load switch control component 122 receive the selected battery voltage (SELBAT) from the battery selector component 124. If DCIN is available, the DCIN voltage is provided as a system supply voltage ($V_{SYS}$) to portable unit devices 148, and a charge voltage (CHARGE) is provided to the battery selector 124, which supplies charge to one or both of the first battery pack 142 and the second battery pack 146. The control system 130 includes algorithms that select the ordering of battery charging through the battery selector component 124 based on any battery pack parameters and/or battery priority. If DCIN is not available, the selected battery voltage (SELBAT) is provided as a system supply voltage ($V_{SYS}$) to the portable unit devices 148. The control system 130 includes algorithms that select the battery that supplies the system supply voltage ($V_{SYS}$) through the battery selector based on any battery pack parameters and/or battery priority.

The power up component 126 provides proper power up and power down sequencing of the portable unit 120. The power up component 126 includes a dedicated voltage regulator that receives power from one of the DCIN supply or the positive terminal of the first battery pack 142 ($V_{1+}$) or the second battery pack 146 ($V_{2+}$) during a power up sequence. This ensures proper initialization of the capacity gauge 128. Upon power up, all switches in the battery selector component 124 and the charger and load switch control component 122 are set to the "OFF" mode, enabling the capacity gauge 128 to execute a power-up configuration procedure. During this phase, a regulated voltage $V_{REG}$ is provided as power to the capacity gauge 128 by a diode-or line that powers the voltage regulator from the higher pack voltage or the DCIN supply. After power up sequencing, the capacity gauge 128 samples the pack voltages and capacities and decides pack selection based on internal algorithms. The selected battery pack then provides the supply voltage to a voltage regulator in the power up component 126, such that $V_{REG}$ is provided by the selected battery.

When the selected battery is removed, a voltage drop on the selected battery line is detected by the capacity gauge 128. The capacity gauge 128 then sets the diode-or mode on in the power up component 126, such that the power up component 126 provides voltage $V_{REG}$ to the capacity gauge 128 through the highest remaining battery pack voltage or DCIN voltage providing power continuity for the capacity gauge 128. The capacity gauge 128 then samples all remaining battery voltages/capacities and decides the new desired pack to be selected. After pack selection, the "OR" mode is reset, and the selected battery pack is employed to power the capacity gauge 128.

Figure 6:
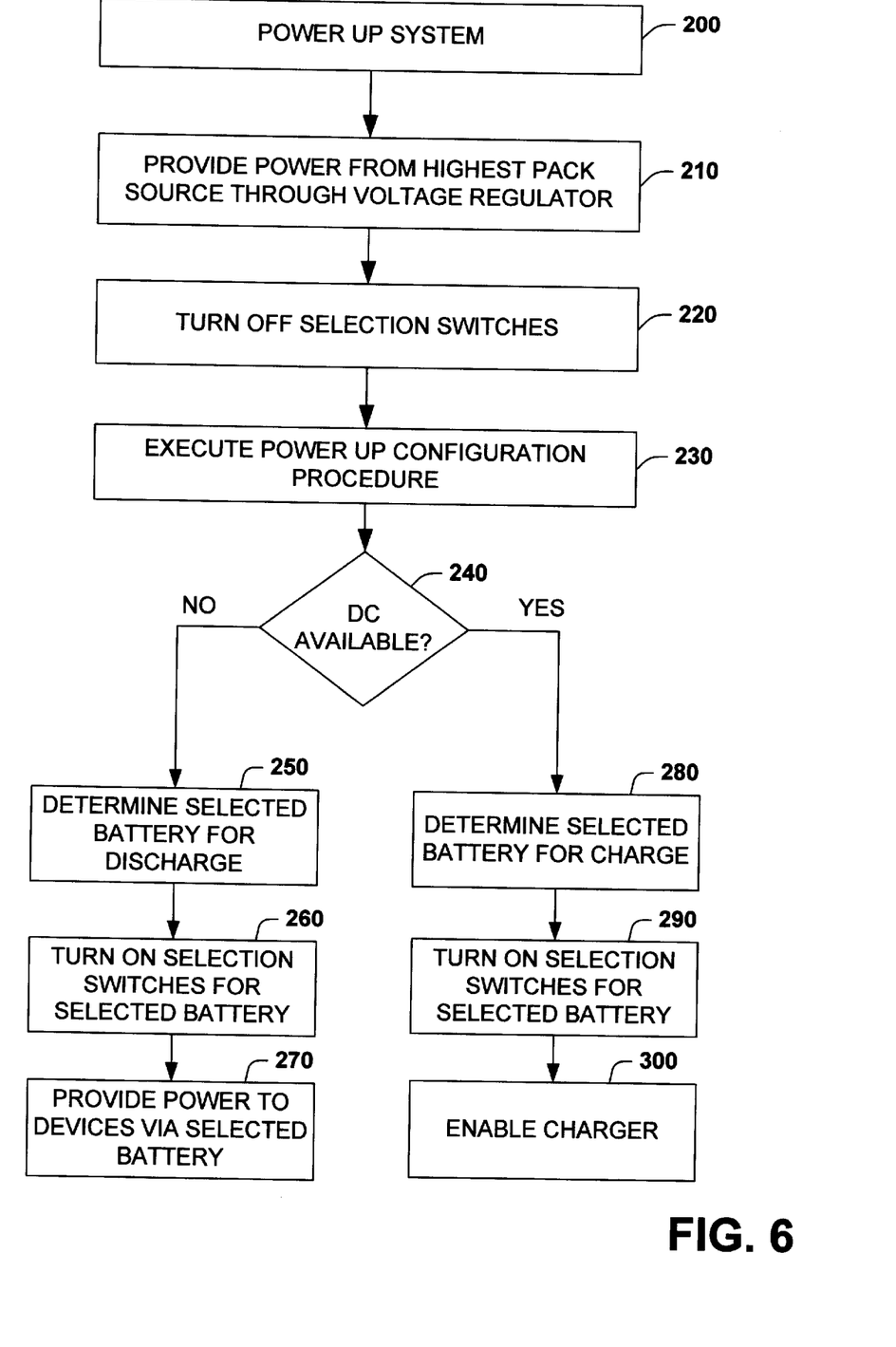
FIG. 6 illustrates block diagram of a methodology for powering up a multiple battery system employing a single capacity gauge in accordance with an aspect of the present invention.
Figure 7:
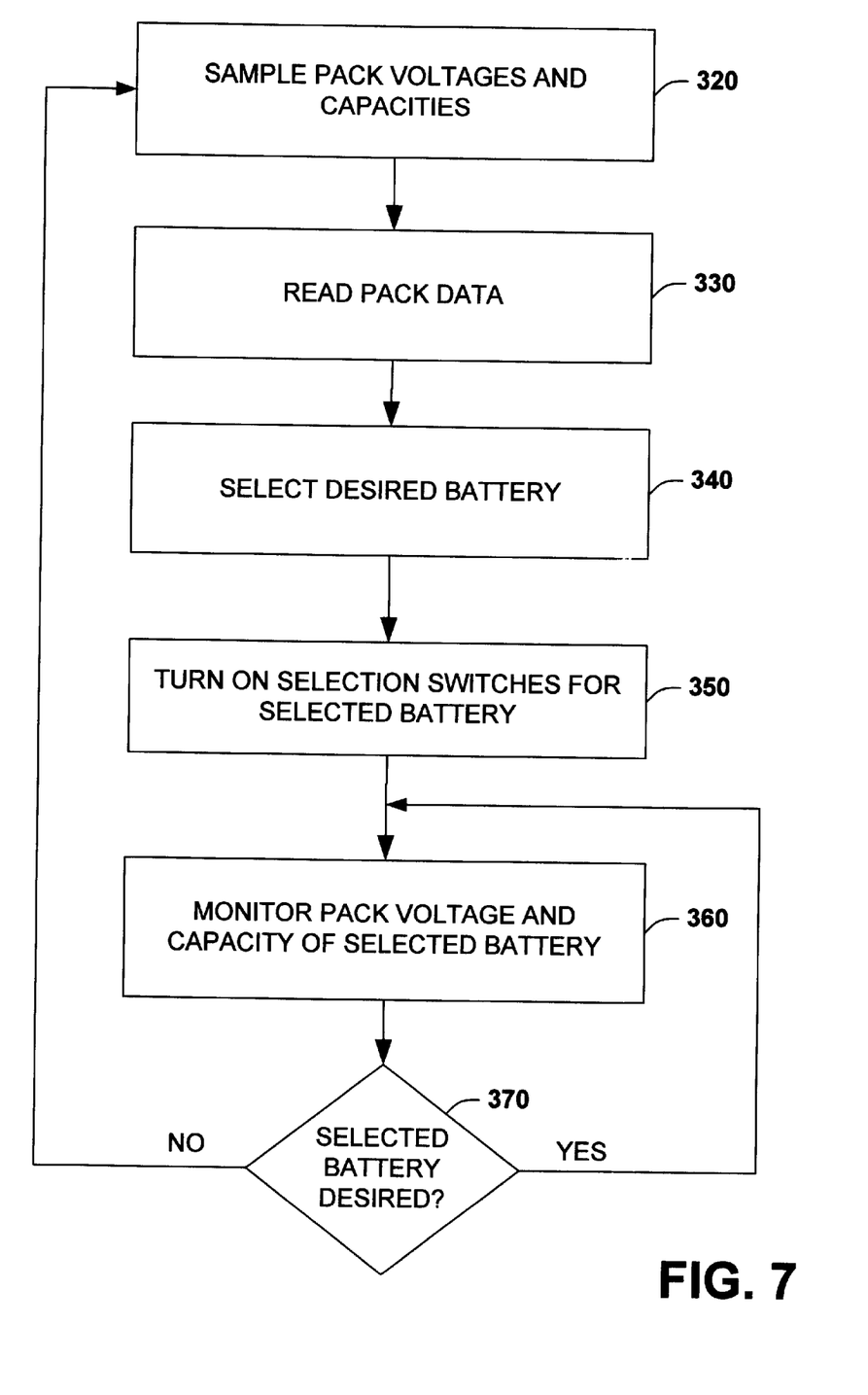
FIG. 7 illustrates block diagram of a methodology for normal operation of a multiple battery system employing a single capacity gauge in accordance with an aspect of the present invention.
Figure 8:
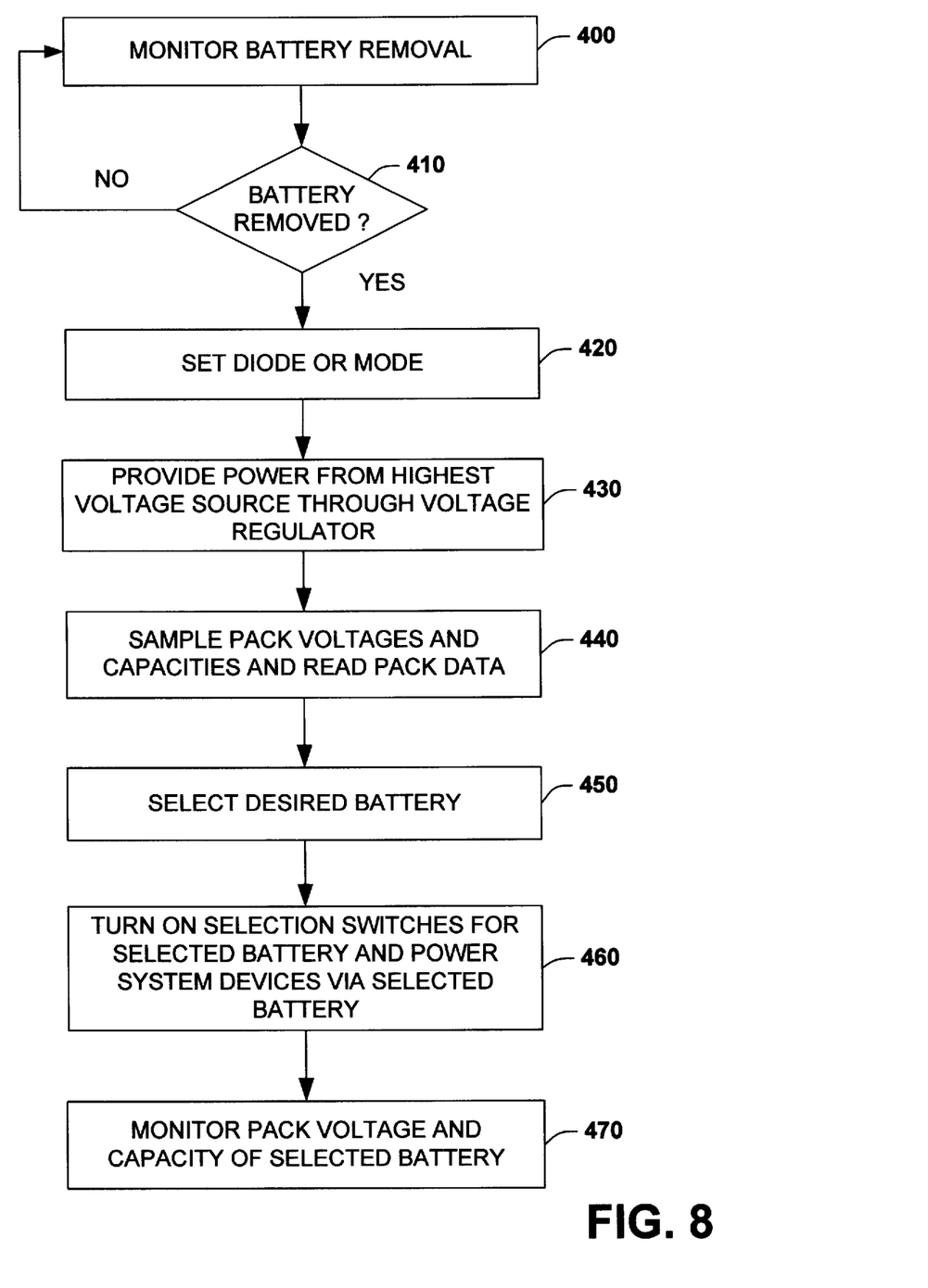
FIG. 8 illustrates block diagram of a methodology for monitoring battery removal of a selected battery for a multiple battery system that employs a single capacity gauge in accordance with an aspect of the present invention.

In view of the foregoing structural and functional features described above, methodologies in accordance with various aspects of the present invention will be better appreciated with reference to FIGS. 6–8. While, for purposes of simplicity of explanation, the methodologies of FIGS. 6–8 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention.

FIG. 6 illustrates one particular methodology for powering devices in a multiple battery system that employs a single capacity gauge in accordance with an aspect of the present invention. At 200, the multiple battery system is powered up. The methodology then proceeds to 210. At 210, power is provided from the highest voltage source through a voltage regulator. For example, the DC voltage source usually has the highest voltage. Therefore, if DC is available, the DC voltage source provides supply voltage to the system devices, such as a control logic device and a capacity gauge, for example, through a voltage regulator. If DC is not available, the highest available battery pack supply voltage provides supply voltage to the system devices. The methodology then proceeds to 220. At 220, the battery selection switches are turned "OFF". The methodology then proceeds to 230 where a power up configuration procedure is performed by the control logic and/or the capacity gauge. The methodology then advances to 240.

At 240, the methodology determines if DC voltage is available. If DC voltage is not available (NO) at 240, the methodology proceeds to 250. At 250, a battery is selected for discharge. The battery selected can be based on priority, battery capacity, battery voltage or one or more other parameters. At 260, the selected battery selection switches are closed to couple the selected battery to a battery bus and the battery bus to the load. At 270, the battery bus is sampled to determine that the selected battery voltage is present, and the power provided to the system devices via the selected battery. If DC voltage is available (YES) at 240, the methodology proceeds to 280. At 280, a battery is selected for charging. The battery selected can be based on priority, battery capacity, battery voltage or one or more other parameters. At 290, the selected battery selection switches are closed to couple the selected battery to the battery bus and the battery bus to the charger. At 300, the charger is enabled and begins charging the selected battery.

FIG. 7 illustrates one particular methodology for normal operation of a multiple battery system that employs a single capacity gauge in accordance with an aspect of the present invention. The methodology begins at 320 where pack voltages and pack capacities are sampled. The pack voltages and pack capacities can be sampled by measuring pack voltages and reading pack histories from the individual battery packs. At 330, a desired battery pack is selected. The desired battery pack can be selected based on at least one of priority, battery capacity, battery voltage or one or more other parameters. The methodology then proceeds to 350. At 350, the appropriate selection switches for the selected battery are turned "ON" or "closed". If DC is available, the selected switches couple the selected battery to a charger for charging. Charging of a battery can be selected based on available charge or battery capacity, charging priority, battery temperature or battery voltage. If DC is not available, the selected switches couple the selected battery to the load in addition to coupling the selected battery to power the devices of the multiple battery system. The methodology then proceeds to 360.

At 360, the pack voltage and capacity of the selected battery is monitored. The battery voltage and capacity is monitored by a single capacity gauge employing a coulomb counter. At 370, the methodology determines if the selected battery is desired. If the selected battery is desired (YES), the methodology returns to 360 to continue monitoring the pack voltage and capacity of the selected battery. If the selected battery is no longer desired (NO), the methodology returns to 320 to repeat the sampling of the pack voltages and capacities to repeat the selection of a different battery.

FIG. 8 illustrates one particular methodology for monitoring of battery removal of a selected battery of a multiple battery system that employs a single capacity gauge in accordance with an aspect of the present invention. The methodology begins at 400 where selected battery removal is monitored. At 410, the methodology determines if the selected battery has been removed. If the selected battery has not been removed (NO), the methodology continues monitoring for selected battery at 400. If the selected battery has been removed (YES), the methodology advances to 420. At 420, the battery charge switches $SC_N$ are turned off, and the battery switches $SD_N$ implementing the diode-or mode. The methodology then proceeds to 430 where power is provided from the highest battery pack voltage source through a voltage regulator. At 440, the remaining pack voltages and pack capacities are sampled. The pack voltages and pack capacities can be sampled by measuring pack voltages and reading pack histories from the individual battery packs.

At 450, a desired battery pack is selected for discharge or powering of the load and system devices. The desired battery pack can be selected based on at least one of priority, battery capacity, battery voltage or one or more other parameters. The methodology then proceeds to 460. At 460, the appropriate selection switches for the selected battery are turned "ON" or "closed". The selected battery selection switches couple the selected battery to the battery bus and the battery bus to the load. The battery bus is then sampled to determine that the selected battery voltage is present, and power provided to the system devices via the selected battery. At 470, the selected battery voltage and capacity of the selected battery are monitored. The battery voltage and capacity is monitored by a single capacity gauge employing a coulomb counter.

What has been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A portable electronic unit comprising:

a control system that selects a battery between a plurality of battery packs to provide a system supply voltage to power at least one portable electronic unit device;

a capacity gauge that measures one of current drawn and current provided to the selected battery pack of the plurality of battery packs, the control system and capacity gauge communicate to determine that the selected battery pack is a desired battery pack, the control system selects a new battery pack to be measured by the capacity gauge and power the at least one portable electronic device if it is determined that the battery pack is no longer the desired battery pack; and a power sequencer component that provides a regulated supply voltage to power the control system and the capacity gauge during one of power up, power down and battery pack removal, the regulated supply voltage being provided by one of a highest pack voltage of the plurality of battery packs and a DC supply voltage.

2. The portable electronic device of claim 1, the power sequencer component provides power to the control system and the capacity gauge by one of the selected battery and the DC supply voltage after a power up configuration procedure is performed.

3. The portable electronic device of claim 1, the power sequencer component comprising a diode "OR" circuit that couples the plurality of battery packs together through respective diodes to a voltage regulator through a switch, such that the highest pack voltage provides power to the voltage regulator, the voltage regulator provides power to the capacity gauge and the control system during power up.

4. The portable electronic device of claim 3, the power sequencer component further comprising a diode coupled to the DC supply voltage and a diode coupled to a battery bus, the switch being opened after the power up sequence, so that power is provided to the capacity gauge and control system by one of the DC supply voltage and the selected battery via the battery bus after the power up sequence.

5. The portable electronic device of claim 1, the power sequencer component provides a regulated supply voltage to power the control system and the capacity gauge when removal of a supply that provides the system supply voltage is detected, the regulated supply voltage being provided by one of a highest pack voltage of the plurality of battery packs and a DC supply voltage until a new system supply voltage is selected.

6. The portable electronic device of claim 1, the control system and the capacity gauge being integrated into a single integrated circuit.

7. The portable electronic device of claim 1, the control system controls a switch network that couples a selected battery pack to a battery bus, the battery bus being coupled to a system supply switch and a charger device, such that the selected battery can be selected to one of provide system supply power to the at least one portable unit device through the supply switch and be charged by the charger if a DC supply is available.

8. A portable electronic unit comprising:

a control system that selects a battery between a plurality of battery packs to provide a system supply voltage to power at least one portable electronic unit device;

a capacity gauge that measures one of current drawn and current provided to the selected battery pack of the plurality of battery packs, the control system and capacity gauge communicate to determine that the selected battery pack is a desired battery pack, the control system selects a new battery pack to be measured by the capacity gauge and power the at least one portable electronic device if it is determined that the battery pack is no longer the desired battery pack; and a precision resistor coupled to negative terminals of the plurality of battery packs and a ground, the capacity gauge measures a voltage across the precision resistor to associate a charge count with the selected battery pack.

9. The portable electronic device of claim 8, the selected battery pack contains information relating to the battery pack that can be employed by the control system and the capacity gauge during charging and discharging of the battery pack.

10. The portable electronic device of claim 9, the control system being operative to read, modify and restore the information to the selected battery pack to maintain a current status of the information.

11. A capacity gauge for a multiple battery system comprising:

a coulomb counter that measures voltage through a precision resistor associated with current drawn and current provided to a selected battery pack of a plurality of battery packs; and a control system that measures at least one parameter associated with each of the plurality of selected battery packs and determines a selected battery pack to monitor by the coulomb counter, the control system provides selection lines operative to switch between selection of a selected battery pack to a battery bus to one of provide a system supply voltage and be charged by a charger, the control system communicates with the coulomb counter to monitor a charge count associated with the selected battery pack.

12. The capacity gauge of claim 11, the control system monitoring the selected battery pack if selected battery is desired and selecting a new desired battery pack if the selected battery pack is no longer desired.

13. The capacity gauge of claim 11, the control system reads information from the plurality of battery packs to determine a desired battery pack to select, the information can be employed during charging and discharging of the selected battery pack, the control system being operative to modify and restore the information to the battery packs to maintain a current status of the information.

14. The capacity gauge of claim 13, the information being at least one of cell type, manufacturer, last time charged, last time discharged, measured capacity, pack temperature, number of discharge and charge cycles and the estimated remaining life of the battery pack.

15. The capacity gauge of claim 11, the control system controls a switch that determines whether the capacity gauge is one of powered by one of a highest pack voltage of the plurality of battery packs and a DC supply voltage during power up, power down and battery removal sequences and by a selected battery pack during normal operation.

16. An integrated circuit comprising the capacity gauge of claim 11.

17. A method for providing power to an electronic device employing a multiple battery pack system with a single capacity gauge, the method comprising:

powering up the multiple battery system;

providing power to the single capacity gauge by one of a highest battery pack voltage and a DC voltage supply;

executing a power up configuration procedure;

selecting a desired battery pack based on at least one parameter associated with each battery pack;

providing power to the single capacity gauge and the electronic device by one of the selected battery pack voltage and a DC voltage supply;

monitoring a charge count associated with the selected battery pack employing the single capacity gauge; and monitoring whether a selected supply voltage is one of removed and no longer desired, and providing power to the single capacity gauge by one of a highest battery pack voltage and a DC voltage supply, selecting a new desired battery pack based on at least one parameter associated with each battery pack, providing power to the single capacity gauge and the electronic device by one of the newly selected battery pack voltage and a DC voltage supply and monitoring a charge count associated with the newly selected battery pack employing the single capacity gauge.

18. The method of claim 17, the monitoring a charge count associated with the selected battery pack comprising monitoring charge being provided to the selected battery if power is provided by the DC voltage supply and monitoring a discharge count of the selected battery pack if power is provided by the selected battery pack voltage.

19. The method of claim 17, the at least one parameter being one of battery pack voltage, battery temperature, battery pack capacity and battery priority.

20. A system for providing power to an electronic device employing a multiple battery pack system with a single capacity gauge, the system comprising:

means for providing power to the single capacity gauge by one of a highest battery pack voltage and a DC voltage supply during a power up sequence;

means for selecting a desired battery pack based on at least one parameter associated with a plurality of battery packs;

means for switching to providing power to the single capacity gauge and the electronic device by one of the selected battery pack voltage and a DC voltage supply;

means for monitoring a charge count measured by the single capacity gauge; and means for monitoring whether a selected supply voltage is one of removed and no longer desired, and providing power to the single capacity gauge by the means for providing power to the single capacity gauge by one of a highest battery pack voltage and a DC voltage supply during a power up sequence.

* * * * *